United States Patent [19]
Kawabata et al.

[11] 4,314,748
[45] Feb. 9, 1982

[54] CAMERA HAVING A SEMI-AUTOMATIC FOCUS ADJUSTING DEVICE

[75] Inventors: Takashi Kawabata, Kamakura; Kazuyas Hosoe, Machida; Nobuhiko Shinoda, Tokyo; Shinji Sakai, Tokyo; Takao Kinoshita, Tokyo, all of Japan

[73] Assignee: Canon Kabushiki Kaisha, Tokyo, Japan

[21] Appl. No.: 151,100

[22] Filed: May 19, 1980

[30] Foreign Application Priority Data

May 23, 1979 [JP] Japan .............................. 54-63374

[51] Int. Cl.³ .............................................. G03B 3/10
[52] U.S. Cl. ..................................... 354/25; 354/195
[58] Field of Search ................ 354/25, 167, 195, 286; 350/46; 352/140; 355/56

[56] References Cited

U.S. PATENT DOCUMENTS 3,972,056 7/1976 Tsujimoto ............................. 354/25
4,067,031 1/1978 Enomoto ............................. 354/195

*Primary Examiner*—Joseph W. Hartary
*Assistant Examiner*—S. D. Schreyer
*Attorney, Agent, or Firm*—Toren, McGeady & Stanger

[57] ABSTRACT

The disclosed camera is focused manually with a helicoidally movable lens barrel and fine focused automatically by movement of the lens mount along the lens' optical axis. The lens mount is automatically started at a predetermined position, such as a mid position, in its movable range, and the automatic operation is disabled when the mount reaches either limit of its movable range.

22 Claims, 5 Drawing Figures

CAMERA HAVING A SEMI-AUTOMATIC FOCUS ADJUSTING DEVICE

BACKGROUND OF THE INVENTION

This invention relates to a camera with a semi-automatic focusing device capable of automatically fine focusing after manual rough focusing.

Various types of automatic focusing devices have been proposed for single lens reflex cameras. These attempt to focus automatically over a wide range and thus have a number of disadvantages. For example, in such conventional devices, the lens, or the portion of the lens being moved, may be displaced along the optical axis over several centimeters. This requires a large amount of space in the camera structure. Also, the large displacement makes if difficult to focus within a short time. If the focusing time is shortened, focusing accuracy frequently suffers.

Furthermore, conventional fully automatic focusing devices may be inadvertently focus on objects before or behind the particular object upon which the photographer wishes to focus.

SUMMARY OF THE INVENTION

One of the objects of the present invention is to provide a very practical and effective device which eliminates completely all of the disadvantages of the conventional automatic focus adjusting devices, and the present invention is based on the finding that the rough focus adjustment can be properly done in a satisfactorily short time even manually.

Another object of the present invention is to provide a camera having an automatic focus adjusting device which can prevent erroneous focusing on marginal objects around the object to be photographed.

Further other object of the present invention is to provide a camera having an automatic focus adjusting device which can effectively shorten the focus adjusting time.

Still further other object of the present invention is to provide a camera having an automatic focus adjusting device of compact and simplified structure.

Further other object of the present invention is to provide a camera having an automatic focus adjusting device which can achieve the above objects without necessity of changing the conventional interchange lens.

According to one embodiment of the present invention, the device comprises a photographic optical system, a manual focus adjusting means for manually moving at least part of the photographic optical system along the optical axis, automatic focus adjusting means and focus adjustment detecting means, wherein the range which can be focused by the automatic adjusting means is set to the required minimum, and the automatic focus adjusting means is controlled on the basis of the detection signal from the focus adjustment detecting means.

Further, the automatic focus adjusting means has means for displacing the mount portion of the camera along the optical axis and detecting this displacement, and means for restricting the driving of the motor for the automatic focus adjustment at the both extremities of the displacement.

Now the present invention has the following advantages:

(1) As the rough focus adjustment is manually performed and then the fine focus adjustment is automatically effected, the erroneous focusing on the marginal objects around the object to be photographed can be greatly reduced.

(2) As the rough focus adjustment which can be done in a relatively short time is performed manually, it is possible not only to effect an AF (automatic focus) operation without any practical hindrance, but also to reduce the amount of displacement of the lens along the optical axis, so that the structure can be made compact and simple.

(3) As the displacement required for focusing is small, the focusing operation can be accomplished quickly and hence accurately.

(4) Even if the rough focus adjustment largely deviates from the focusing position, excessive power supply to the motor is avoided by the control circuit according to the present invention, and the direction of the deviation can be easily observed by the photographer.

(5) Because the displacement member for the automatic focus adjustment after completion of photography is designed so as to return to the middle point of the displacement range, the focusing operation in any direction can be stably performed.

(6) Because the manual rough focus adjusting means is provided on the lens helicoid barrel, while the automatic fine focus adjusting means is provided on the mount portion of the camera, all types of conventional interchange lenses can be used without any modification.

DESCRIPTION OF PREFERRED EMBODIMENTS

Figure 1:
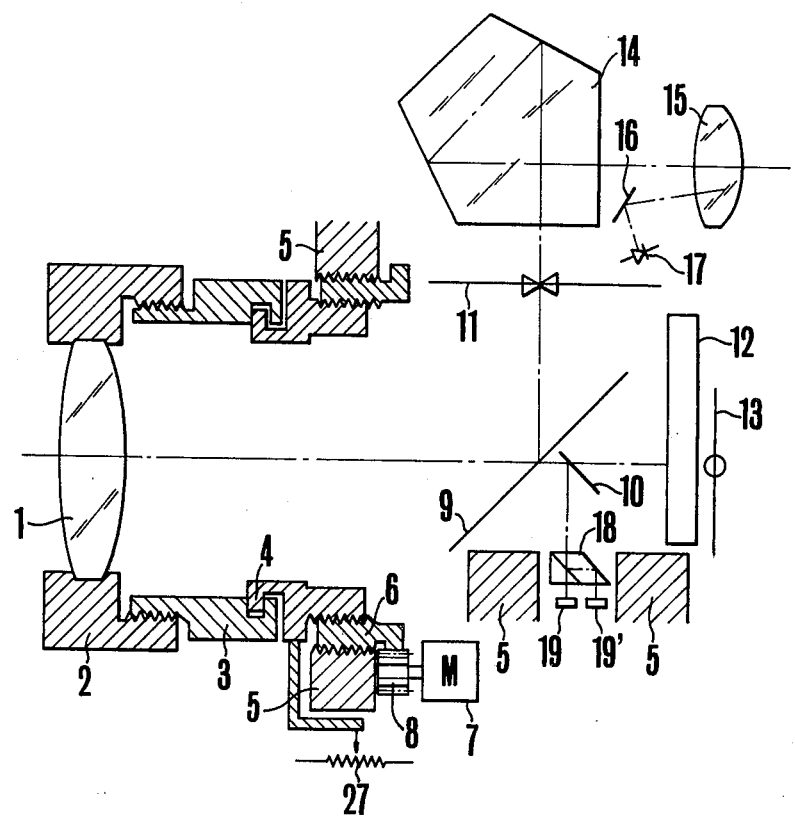
FIG. 1 schematically shows the semi-automatic focus adjusting device according to the present invention.

In FIG. 1 showing schematically the relation between the semi-automatic focus adjusting device according to the present invention and the photographic optical system, etc., member 1 is a taking lens, 2 is a hericoid barrel, 3 is a barrel, 4 is a mount portion on the camera body, 5 is a part of the camera body, and a mount helicoid 6 for moving the mount portion along the optical axis is provided between the mount portion 4 and the camera body 5. Element 7 is a motor having a gear fixed to its shaft and engaged with the mount hericoid 6. The mount portion 4 is displaced along the optical axis by means of the gear 8 and the most hericoid 6. Element 9 is a quick-return mirror, partially or wholly a half mirror. Member 10 is a quick-return mirror for a distance measuring optical system, 11 is a focusing screen, 12 is a shutter, 13 is a film surface, 14 is a pentaprism, 15 is an ocular, 16 is a reflection mirror for indication of finder informations, 17 is an indication member, such as a light emitting diode, for indicating the finder informations.

Member 18 is a deflection member for the distance measuring optical system, and divides the light flux from the quick-return mirror into two photoelectric transducing elements 19, 19'. A member 27 detects fine displacement of the mount portion 4, and in this embodiment a variable resistor is used.

With a structure as above, a rough focus adjustment of the taking lens 1 is achieved by moving the helicoid barrel 2, the mount portion 4 is finely displaced along the optical axis by the automatic focus adjustment mechanism comprising the photoelectric transducing elements 19, 19' as a focus detector, and the motor 7 as a focus adjusting circuit output so as to perform focusing.

In this case, it is needless to say that the focus adjustment mechanism may be provided on the interchangeable lens.

Figure 2:
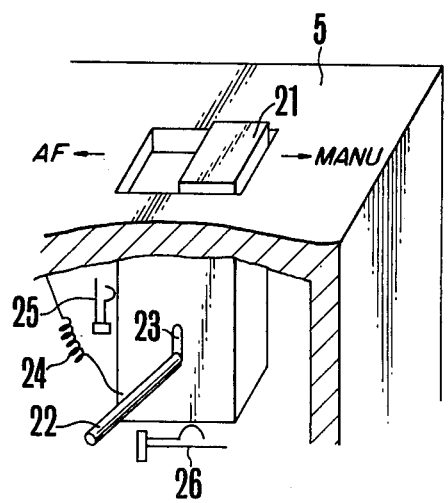
FIG. 2 schematically shows the release button mechanism according to the present invention.

In FIG. 2 showing one embodiment of the release button mechanism, 5 is the camera body. Member 21 is a release button, 22 is a fixed shaft inserted in an elongated hole 23 provided in a part of the release button and urged by the spring 24 in the release liberation direction (upward in this embodiment). Element 25 is AF (auto-focus) system switch, 26 is a photographic switch, both normally opened. The photographic switch may conventionally perform light measurement at the first shutter release position, and AE (automatic exposure control) and shutter release by the second stroke.

With the structure as above, when the release button is pushed down directly, ordinary photography is performed and when it is slided to the left and then pushed down, photography with AF is performed.

If focusing is impossible after the release button is slided to AF side, the photography can be quickly changed to the ordinary one by returning the release button to the right.

Figure 3:
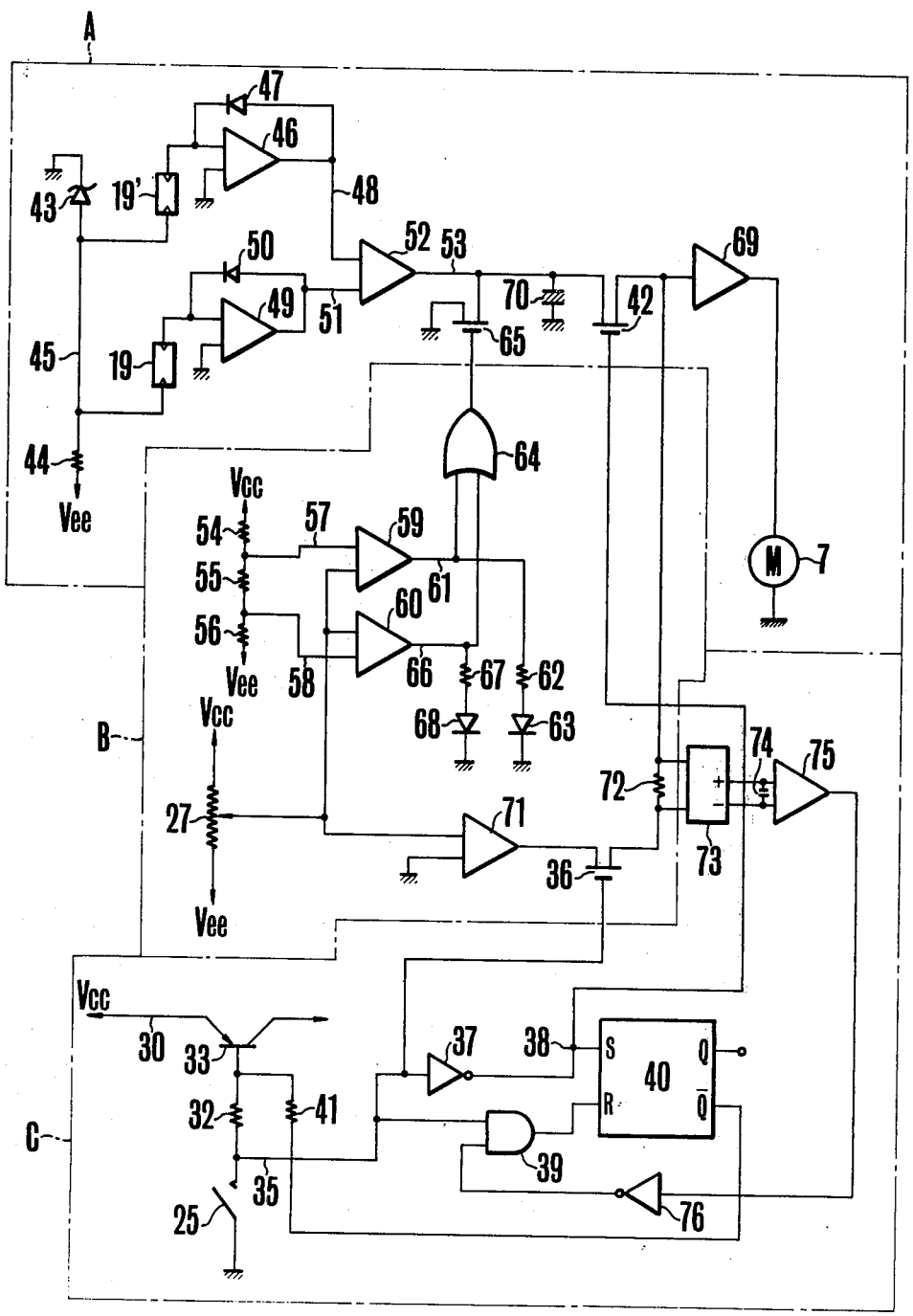
FIG. 3 shows one embodiment of the focusing control circuit according to the present invention.

In FIG. 3 showing one embodiment of the focus adjustment control circuit according to the present invention, the block A represents the focus detection circuit and the motor driving circuit, B represents the front and rear ends detection circuit, and C is the power supply control circuit.

In the block A, 19 and 19' are respectively the photoelectric transducing element as mentioned before, such as CdS. Element 43 is a constant voltage diode, 46, 49 are respectively an operation amplifier, 52 is a differential amplifier, 69 is a power amplifier, 70 is a condenser, 7 is a motor, 47, 50 are respectively a logarithmic compression diode, 44 is a resistor, Vcc is a positive voltage source, Vee is a negative voltage source.

CdS 19, 19' are supplied with a constant bias voltage by the constant voltage diode 43 and the resistor 44 and produce a change in the resistance value in correspondence to the incident light flux. This change in the resistance is input as a potential change to the differential amplifier 52 through the logarithmic amplifier composed of the operation amplifier 46 and the diode 47 and the logarithmic amplifier composed of the operation amplifier 49 and the diode 50.

Therefore, the differential amplifier outputs focusing informations resulting from the comparison of the condition of light incident on CdS 19, 19'.

In this case, however, informations such as of the brightness or contrast of an object are not included, but these informations may be contained in the focusing information by using another focus detection means so as to obtain signals of the front and rear focus.

The signals of the front and rear focus are passed through the analog switches 65 and 42 and then input to the power amplifier 69 so as to produce a power necessary to selectively rotate the reversible motor 7.

Therefore, in this condition, if the control input of the analog switches 65 and 42 is at a high level, the motor rotates in a direction for recovering the focal deviation in correspondence to the image formation by the photographic optical system and stopps at the focusing position.

The block B is the detection circuit for detecting the front and rear extremities of the movable range of the mount, and stopping the motor 7 when the mount reaches the front or rear extremity. 54, 55 and 56 are dividing resistors connected in series for setting a reference voltage value when the mount is at the front or rear extremity, and 59 and 60 are respectively a comparator. One of the input terminals of the comparator 59 is connected to the connection point of the resistors 54 and 55, the other input terminal is connected to one of the input terminals of the comparator 60 and also connected to the dividing terminal of the resistor 27 for detection of the mount position. The other input terminal of the comparator 60 is connected to the connection point of the resistors 55 and 56. The both terminals of the resistor 27 are connected to the voltage sources Vcc and Vee respectively.

A logic OR gate has two inputs respectively connected to the output terminals of the comparators 59 and 60. The output of the OR gate 64 is connected to the gate control input of the analog switch 65 composed of FFT etc. and one terminal of the analog switch is connected to the earth and the other terminal is connected to the output of the differential amplifier 52.

The dividing output from the variable resistor 27 for detecting the mount position is compared with the reference voltages of the front and rear extremities by the comparators 59 and 60. Therefore, when the mount position reaches the front or rear extremity, the output of either of the comparators 59 and 60 become high level.

Also the outputs of the comparators 59 and 60 are respectively connected to the resistor 62 and LED 63 and the resistor 67 and LED 68. Therefore, when the mount position reaches the front or rear extremity, either of LEDs 63 and 68 become on and indicate the mount position.

Further, at this time, the output of the OR gate becomes high level so that the analog switch 65 becomes ON to cut the focus detection signal.

For example, with the mount position at the front extremity, a high level signal is obtained at the point 61 to make indication in the finder by the resistor 62 and LED 63, thereby informing the photographer of the impossibility of distance measurement by the front step.

With the above indication, the photographer makes decision whether he should move out the taking lens or change the AF operation to the manual operation. In this case, the output of the OR gate 64 is made high level to turn the analog switch ON and cut excessive power supply to the motor.

With the mount position at the rear extremity, a high level signal is obtained at the point 66 to indicate the mount position at the rear extremity at LED 68 by the resistor 67, and in a similar way as above, the power supply to the motor is cut.

When the AF operation is stopped, the dividing output from the mount position detection resistor 27 is connected to the input terminal of the comparator 71, and the other input terminal of the comparator 71 is connected to the earth. The output terminal of the comparator 71 is connected to the input terminal of the power amplifier 69 through the analog switch 36 and the resistor 72. Therefore, when the analog switch 36 goes on (while the analog switch 42 is turned off), the motor 7 is driven in correspondence to the output of the mount position detection resistor 27, thereby the mount is moved back and forth so that the motor is driven until the divided voltage value becomes zero. When the mount is positioned at the middle of its movable range, the divided voltage value of the resistor 27 becomes zero.

C represents the power supply control circuit, 33 is a PNP transistor, 37, 76 are respectively an inverter, 39 is an AND gate with two inputs, 40 is a RS flip-flop, 73 is a rectifier, 74 is a condenser, 75 is a differential amplifier, 32, 41 are respectively a resistor, 25 is the AF switch as shown in FIG. 2.

The emitter of the transistor 33 is connected to the power source Vcc, and the collector is connected to an element of each circuit. The base is connected to the earth through the resistor 32 and the AF switch 25. Also, the base of the transistor 33 is connected to the $\bar{Q}$ or invert of Q output terminal of the RS flip-flop 40 through the resistor 41. The connecting point of the switch 25 and the resistor 32 is connected to the gate of the analog switch 36 and also connected to the inverter 37 input. The output of the inverter 37 is connected to the gate of the analog switch 42 and also connected to the S (set) input terminal of the RS flip-flop. Further, the connection point of the resistor 32 and the switch 25 is connected to one of input terminals of the AND gate 39, and output terminal of the AND gate is connected to the R (reset) input terminal of the RS flip-flop 40.

The rectifier 73 converts the voltages at the both extremities into an absolute value and then inputs them into the differential amplifier 25. Between the two input terminals, the condenser 74 is connected so as to prevent a transient signal from the rectifier 73. The output of the differential amplifier 75 is connected to the other input terminal of the AND gate 39.

At the time of photographing, when the AF switch 25 is closed, the analog switch 36 goes OFF as mentioned hereinbefore, and at the same time the analog switch 42 becomes ON through the inverter 37. Further, a high level signal is added to the S (set) input of RS flip-flop while a low level signal is added to the R (reset) input through the AND gate 39 so that a low level signal is produced at the $\bar{Q}$ or invert of Q output of the RS flip-flop. This signal is added to the base of the transistor 33 through the resistor 41 so that the transistor 33 holds ON. Then until the RS flip-flop is reset by the restoration of the mount to the middle point position, the power is continued to be supplied even if the AF release switch is cut off.

As the mount position detecting resistor 27 is constructed to produce a zero voltage when the mount is at the middle point of the movable range, a negative or positive potential is caused if the mount deviates from the middle point. This potential is converted into an absolute value by the rectifier 73 and inputs to the AND gate 39 through the differential amplifier 75 and the inverter 76. Therefore, it is only after the AF release switch 25 goes OFF and the photograph is finished, and the mount restores to the middle point of the movable range that the $\bar{Q}$ or invert of Q output of the RS flip-flop 40 goes high. At this time, the transistor 33 goes OFF so that the power supply to individual elements in the circuit is cut off.

Thus, according to the focus control circuit as described above the motor is continued to be driven until the focus detection signals from the photoelectric transducing elements 19, 19' coincide with each other, and when the rough focal adjustment by hand so largely deviates from the focusing position that the fine automatic focus adjustment is impossible, the excessive power supply to the motor is stopped, the direction in which the rough focus adjustment should be corrected is indicated, and the mount position is restored to the middle point of the movable range even after the completion of photography, so that the fine focus adjustment is possible with consistency.

Further, even if the photographer should change over the release switch to the manual side by an erroneous AF operation, etc., the AF switch 25 becomes OFF, but the power supply is continued by the flip-flop 40 driving the restoration movement of the mount to the middle point.

Figure 4:
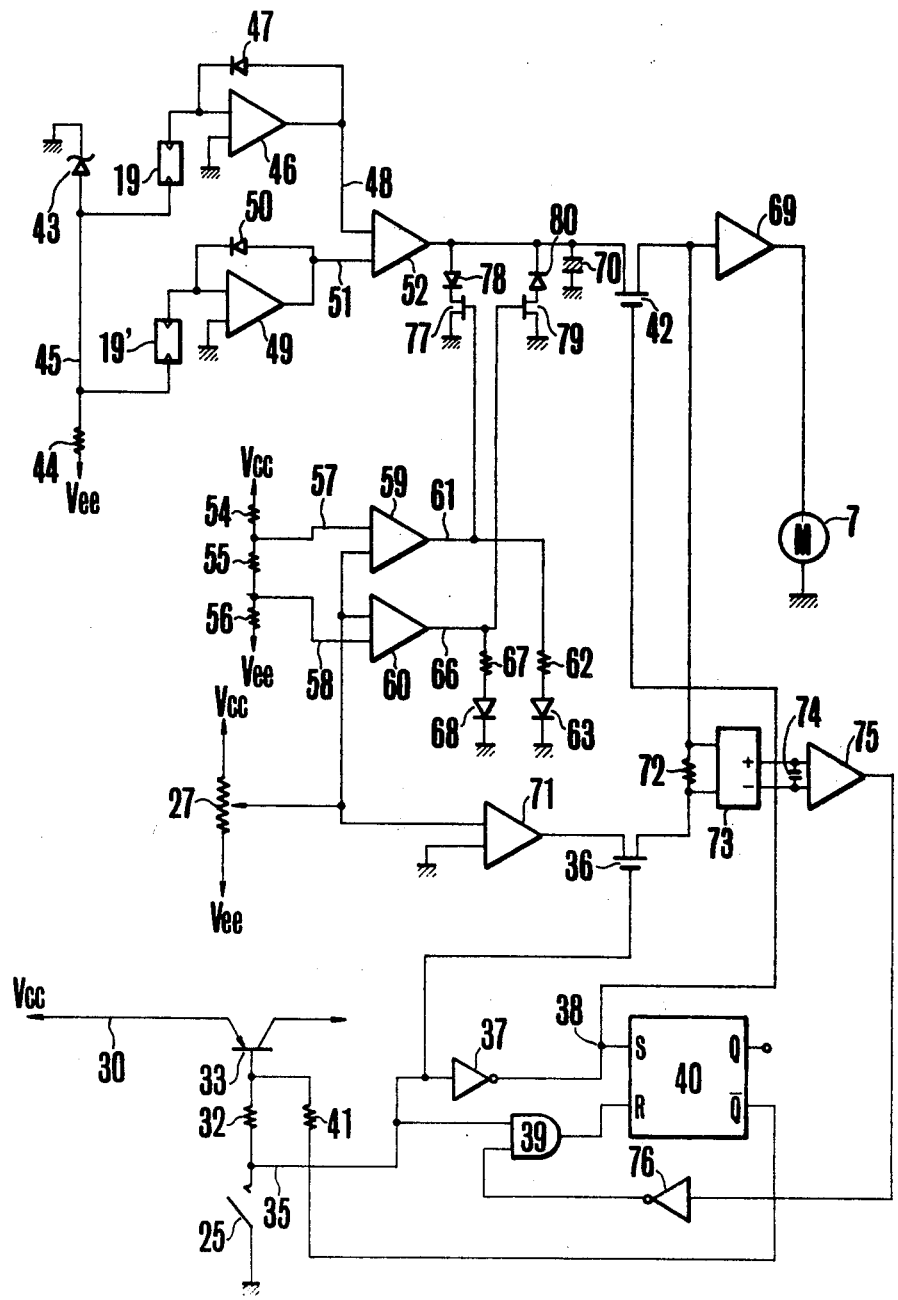
FIG. 4 shows a second embodiment of the focusing control circuit.

In the second embodiment of the focusing control circuit according to the present invention shown in FIG. 4, only the displacement of the mount beyond the both extremities of the movable range is prevented, while in the first embodiment shown in FIG. 3, the power supply to the motor 7 is completely stopped at the both extremities of the movable range. Therefore, in the second embodiment, when the front extremity position is detected, the motor is prevented only from its driving the mount forward, and allowed to drive the mount backward.

On the other hand, when the rear extremity position is detected, the motor is prevented only from its driving the mount backward, but allowed to drive the mount forward.

In FIG. 4 the same numerical references as in FIG. 3 represent the same members with the same connections.

Numerals 77 and 79 each represent an analog switch, i.e., a FET, and the gate input terminals of the switches are connected respectively to the output terminals of the comparators 59 and 60. One of the output terminals of the above analog switch 77 is connected to the earth and the other output terminal is connected to the cathode of the diode 78, and the anode of the diode 78 is connected to the output terminal of the differential amplifier 52. Meanwhile, one of terminals of the analog switch 79 is connected to ground and the other terminal is connected to the anode of the diode 80. The cathode of the diode 80 is also connected to the output terminal of the differential amplifier 52.

As described hereinbefore, at the front extremity position, the signal at the point 61 becomes high level so that the analog switch 77 becomes ON, thus preventing a signal for further forward movement of the mount 16 prevented by the diode 78 and permitting only the backward movement of the mount. Similarly, at the rear extremity position, the signal at the point 66 is made high level so as to turn the analog switch 79 ON, thus prohibiting the backward movement of the mount while allowing only the forward movement.

Figure 5:
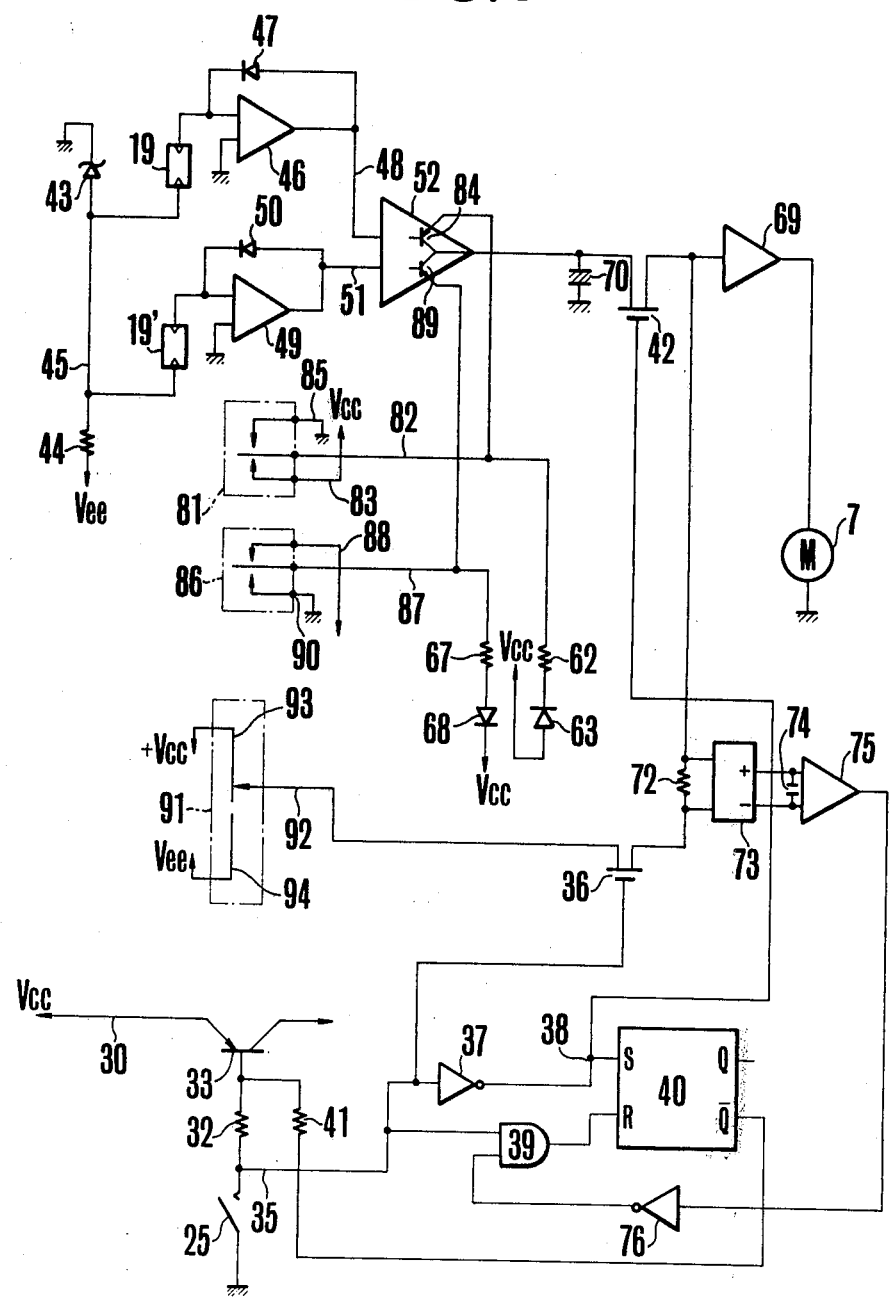
FIG. 5 shows a third embodiment of the focusing control circuit.

For the restriction at the front and rear extremities, the position detection by the variable resistor 27 as described before is not always necessary, but a conventional restricting circuit as shown in FIG. 5 may be used.

In FIG. 5 showing the third embodiment of the focusing adjustment device according to the present invention, the same numerical references represent the same members as shown in FIG. 3 and FIG. 4, 81 represents a front extremity restricting switch, which is normally connected at the point 82 to the point 83, namely Vcc. Therefore, the output step from transistor 84 in the differential amplifier 52 allows the forward movement of the mount because the emitter is connected to Vcc.

At the front extremity, the restriction switch 81 is changed over, thus connecting the point 82 to the earth 85 hence the emitter of the transistor 84 being earthed, so that the rotation of the motor for further forward movement of the mount is prevented and at the same time LED 63 connected to Vcc is supplied with current through the resistor 62 to indicate the restriction at the front extremity.

Similarly, the rear extremity restriction switch 86 is normally connected at the point 88 to Vee, and after the output generation the emitter of the transistor 89 is connected to Vee to allow the backward movement of the mount.

At the rear extremity, the restriction switch 86 is changed over and the point 87 is connected to the earth 90. Further, the rotation of the motor for further backward movement of the mount is prevented by the transistor 89, and at the same time LED 68 connected to Vee is supplied with current through the resistor 67 to indicate the restriction at the rear extremity.

Element 91 is a restoration contact point composed of an element for detecting the front and rear position of the mount, and it is designed so as to contact the portion 93 by means of a brush 92, when the lens is moved forward for example and to rotate the motor for the backward movement. At the middle point position and the zero potential position, it contacts with the portion 94 when the lens is moved backward to rotate the motor for the forward movement of the mount driving the restoring movement following the completion of photography.

What is claimed is:

1. A camera having a semi-automatic focus adjusting device comprising:
    (a) a photographic optical system for forming an image of an object on a predetermined focal plane in the camera;
    (b) manual focus adjusting means for displacing at least part of the photographic optical system along the photographic optical axis to form a clear image of an object within a range from a close-up position to an infinite position on the predetermined focal plane;
    (c) automatic focus adjusting means including a motor for displacing at least part of the photographic optical system a predetermined amount along the photographic optical axis, the object distance range which can be focused by the predetermined amount of displacement being narrower than the object distance range of the manual focus adjusting means;
    (d) focus adjustment detecting means for detecting the condition of the image formed on the predetermined focal plane by the photographic optical system, said detecting means having a motor drive control circuit for controlling the drive of the motor in response to the detecting means so as to displace the part of the photographic optical system displaceable by the automatic focus adjusting means in the direction of focusing in the range of the predetermined amount of displacement;
    (e) a lens barrel for holding the photographic optical system and displaceable by said automatic adjusting means along the photographic optical axis;
    (f) said camera including a body having a mount portion and the lens barrel is removably mounted on the mount portion of the camera body, and the automatic focus adjusting means is arranged to displace the mount portion along the photographic optical axis.

2. A camera having a semi-automatic focus adjusting device comprising:
    (a) a photographic optical system for forming an image of an object on a predetermined focal plane in the camera;
    (b) manual focus adjusting means for displacing at least part of the photographic optical system along the photographic optical axis to form a clear image of an object within a range from a close-up position to an infinite position on the predetermined focal plane;
    (c) automatic focus adjusting means including a motor for displacing at least part of the photographic optical system a predetermined amount along the photographic optical axis, the object distance range which can be focused by the predetermined amount of displacement being narrower than the object distance range of the manual focus adjusting means;
    (d) focus adjustment detecting means for detecting the condition of the image formed on the predetermined focal plane by the photographic optical system, said detecting means having a motor drive control circuit for controlling the drive of the motor in response to the detecting means so as to displace the part of the photographic optical system displaceable by the automatic focus adjusting means in the direction of focusing in the range of the predetermined amount of displacement;
    (e) means for supplying power to the motor so as to move the part of the photographic optical system displaceable by the automatic focus adjusting means to a predetermined position within the movable range after completion of the automatic focus adjusting operation by the automatic focus adjusting means.

3. A camera having a semi-automatic focus adjusting device according to claim 2, further comprising a lens barrel for holding the photographic optical system and displaceable by said automatic adjusting means along the photographic optical axis.

4. A camera having a semi-automatic focus adjusting device according to claim 2, in which the manual focus adjusting means includes a helicoid screw for moving the lens barrel forward and backward.

5. A camera having a semi-automatic focus adjusting device according to claim 2, which further comprises movement indicating means for transducing the amount of movement of the part of the photographic optical system displaceable by the automatic focus adjusting means into an electrical value.

6. A camera having a semi-automatic focus adjusting device according to claim 5, in which the movement indicating means comprises a slide resistor which varies in resistance value in association with displacement of the part of the photographic optical system displaceable by the automatic focus adjusting means.

7. A camera having a semi-automatic focus adjusting device according to claim 2, which further comprises extremity detection means for generating a signal when the part of the photographic optical system displaceable by the automatic focus adjusting means reaches an extremity of its movable range.

8. A camera having a semi-automatic focus adjusting device according to claim 7, which further comprises restriction means for preventing the motor from driving the photographic optical system beyond its movable range when the signal from the extremity detecting means is received.

9. A camera having a semi-automatic focus adjusting device according to claim 8, in which the restricting means is designed to stop power to the motor when the signal is generated by the extremity detecting means.

10. A camera having a semi-automatic focus adjusting device according to claim 7, which further comprises means for indicating that a signal is obtained from the extremity detecting means.

11. A camera having a semi-automatic focus adjusting device comprising:
   (a) a photographic optical system for forming an image of an object on a predetermined focal plane in the camera;
   (b) manual focus adjusting means for displacing at least part of the photographic optical system along the photographic optical axis to form a clear image of an object within a range from a close-up position to an infinite position on the predetermined focal plane;
   (c) automatic focus adjusting means including a motor for displacing at least part of the photographic optical system a predetermined amount along the photographic optical axis, the object distance range which can be focused by the predetermined amount of displacement being narrower than the object distance range of the manual focus adjusting means;
   (d) focus adjustment detecting means for detecting the condition of the image formed on the predetermined focal plane by the photographic optical system, said detecting means having a motor drive control circuit for controlling the drive of the motor in response to the detecting means so as to displace the part of the photographic optical system displaceable by the automatic focus adjusting means in the direction of focusing in the range of the predetermined amount of displacement;
   (e) extremity detection means for generating a signal when the part of the photographic optical system displaceable by the automatic focus adjusting means reaches an extremity of its movable range;
   (f) means for indicating that a signal is obtained from the extremity detecting means; (g) means for maintaining power supply to related circuit portions until the part of the photographic optical system displaceable by the automatic focus adjusting means restores to a predetermined position in the movable range after completion of the automatic focus adjusting operation by the automatic focus adjusting means.

12. For use with a photographic optical system having at least a portion manually movable along an optical axis for focusing from close-up to infinity when used with a camera body, a camera body comprising:
   (a) film receiving means for receiving film and defining a focal plane;
   (b) automatic adjusting means for displacing the manually movable portion along the optical axis from its manually adjusted position over a given range less than the overall range needed to focus from close-up to infinity when the optical system is used with the body, said adjusting means including a motor;
   (c) focus control means for detecting the focused condition of an image on the focal plane and for driving the motor to displace the portion toward a focused condition within the given range when the optical system is used with the body;
   (d) said control means including reset means for resetting the portion to a predetermined intermediate position in the given range.

13. A camera body as in claim 12, further comprising a lens mount for mounting of the optical system on the camera body, said automatic adjusting means being arranged to displace the lens mount along the optical axis.

14. A camera body as in claims 12 or 13, further comprising extremity detecting means for generating a signal when the adjusting means moves the portion to a limit in the given range.

15. A camera body as in claim 14, further comprising restriction means for preventing the motor from driving the portion beyond the limit when the detecting means produces a signal.

16. A camera body as in claims 12 or 13, wherein said control means includes means for resetting the portion to a midpoint in the given range.

17. A camera body as in claim 14, wherein said reset means are arranged for resetting the portion to the midpoint in the given range.

18. A camera body as in claim 15, wherein said control means includes means for resetting the portion to a midpoint in the given range.

19. A camera body as in claim 12 or 13, wherein said automatic adjusting means includes a lens mount for mounting the photographic optical system, said lens mount being movable over the given range.

20. A camera body as in claim 14, wherein said automatic adjusting means includes a lens mount for mounting the photographic optical system, said lens mount being movable over the given range.

21. A camera body as in claim 15, wherein said automatic adjusting means includes a lens mount for mounting the photographic optical system, said lens mount being movable over the given range.

22. A camera body as in claim 16, wherein said automatic adjusting means includes a lens mount for mounting the photographic optical system, said lens mount being movable over the given range.

* * * * *